US012689901B2

(12) United States Patent
Lummer et al.

(10) Patent No.: US 12,689,901 B2
(45) Date of Patent: Jul. 21, 2026

(54) RELAY STATION ATTACK PREVENTION

(71) Applicant: TEXAS INSTRUMENTS INCORPORATED, Dallas, TX (US)

(72) Inventors: Werner Lummer, Landshut (DE); Stefan Klaus Beierke, Furth (DE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 405 days.

(21) Appl. No.: 16/743,153

(22) Filed: Jan. 15, 2020

(65) Prior Publication Data

US 2021/0204136 A1 Jul. 1, 2021

Related U.S. Application Data

(60) Provisional application No. 62/954,755, filed on Dec. 30, 2019.

(51) Int. Cl.
| | |
|---|---|
| *H04L 29/06* | (2006.01) |
| *B60R 25/24* | (2013.01) |
| *H04W 4/02* | (2018.01) |
| *H04W 12/06* | (2021.01) |
| *H04W 12/122* | (2021.01) |
| *B60R 25/01* | (2013.01) |

(Continued)

(52) U.S. Cl.
CPC ......... *H04W 12/122* (2021.01); *B60R 25/245* (2013.01); *H04W 4/023* (2013.01); *H04W 12/06* (2013.01); *B60R 25/01* (2013.01); *B60R 2025/0405* (2013.01); *B60R 25/209* (2013.01)

(58) Field of Classification Search
CPC ... H04W 12/122; H04W 4/023; H04B 17/318
See application file for complete search history.

(56) References Cited

U.S. PATENT DOCUMENTS 5,805,056 A * 9/1998 Mueller .............. B60R 25/1003
340/426.21
9,584,542 B2 2/2017 Kim et al.
(Continued)

FOREIGN PATENT DOCUMENTS

RU 2513763 C1 4/2014
WO 20190244495 A1 12/2019

OTHER PUBLICATIONS

Hagl A., and Aslanidis, K. (2008) RFID: Fundamentals and Applications. In: Kitsos P., Zhang Y. (eds) RFID Security. Springer, Boston, MA (pp. 3-26).

(Continued)

*Primary Examiner* — Wasika Nipa
(74) *Attorney, Agent, or Firm* — Michelle F. Murray; Frank D. Cimino

(57) ABSTRACT

A system includes a plurality of antennas, an access control mechanism, and a computing resource. The computing resource is configured to initiate each of multiple antennas to transmit a wireless signal and receive values indicative of signal strength of the wireless signals from the multiple antennas. The computing resource also is configured to calculate a position of a wireless electrical device based on the received values and calculate an error value of the calculated position of the wireless electrical device. Further, the computing resource is configured to determine that the error value is greater than an error threshold and to disable the access control mechanism.

20 Claims, 6 Drawing Sheets

(51) Int. Cl.
    *B60R 25/04*         (2013.01)
    *B60R 25/20*         (2013.01)

(56)                References Cited

U.S. PATENT DOCUMENTS

| | | | |
|---|---|---|---|
| 9,894,492 B1 * | 2/2018 | Elangovan | H04W 4/023 |
| 2010/0150061 A1 * | 6/2010 | Cho | H04W 16/20 |
| | | | 370/328 |
| 2014/0375420 A1 | 12/2014 | Seiberts et al. | |
| 2015/0222658 A1 | 8/2015 | Kim et al. | |
| 2015/0302673 A1 * | 10/2015 | Seiberts | G07C 9/00309 |
| | | | 340/5.61 |
| 2016/0086401 A1 * | 3/2016 | Choi | G07C 9/00309 |
| | | | 340/5.61 |
| 2017/0339236 A1 * | 11/2017 | Kim | G01S 11/06 |
| 2019/0317467 A1 * | 10/2019 | Blaine | B26D 5/00 |
| 2021/0105573 A1 | 4/2021 | Tokunaga | |
| 2022/0024412 A1 * | 1/2022 | Kelly | G01S 5/0284 |

OTHER PUBLICATIONS

Notification of Transmittal of the International Search Report and the Written Opinion of the International Searching Authority, or the Declaration; PCT/US2020/064773; mail date Mar. 12, 2020, 8 pages.

\* cited by examiner

RELAY STATION ATTACK PREVENTION

CROSS-REFERENCE TO RELATED APPLICATION

This application claims priority to U.S. Provisional Application No. 62/954,755, filed Dec. 30, 2019, which is hereby incorporated by reference in its entirety.

BACKGROUND

Contactless wireless security systems, including automotive keyless entry systems, such as Passive Entry/Passive Start (PEPS) systems, face a threat referred to as a "relay attack" or "relay station attack," which may result in the theft of a vehicle without the owner's awareness. A relay attack may involve two individuals, although any number of individuals may be utilized, working in cooperation with each other. Each of the two individuals carries a device (referred to as an attack kit) capable of receiving a signal from either the vehicle or the vehicle's key fob and forwarding the received signal to the other individual after amplifying the signal. In one scenario, the individuals follow the vehicle and its driver. The driver stops at, for example, a store or a restaurant. Individual-1 stands adjacent to the parked vehicle while individual-2 follows and stands next to the owner of the vehicle (who may be inside the store or restaurant or any other location away from the car). Individual-1 initiates a door unlock operation by touching the car handle, pulling the car handle, or pushing a button on the car, which normally requires a valid key fob to be within a certain distance of the door. Upon initiating the unlock operation, the vehicle broadcasts a wireless signal intended for reception by a valid, nearby key fob.

The attack kit carried by individual-1 picks up the wireless signal being broadcast by the vehicle and relays the signal (such as physical layer signals or encrypted bit streams) to the attack kit of individual-2. Upon receiving the signal from the attack kit of individual-1, the attack kit of individual-2 replicates the signal in the format commensurate with the key fob and transmits the replicated key fob-compliant signal to the key fob carried by the vehicle's owner (which presumably is within sufficient range of individual-2); thereby waking up the key fob. The key fob which receives the wireless signal and cannot distinguish individual-2's attack kit from the vehicle itself considers the attack kit carried by individual-2 as the vehicle, and, as it is configured to do, transmits a wireless response signal to authenticate the key fob to the vehicle. This response signal is then received by the attack kit of individual-2 which relays the signal back to the attack kit of individual-1. The attack kit of individual-I receives the response and replicates a wireless signal compatible with the vehicle. The vehicle's wireless communication system cannot distinguish a wireless signal from the attack kit of individual-1 from the key fob itself and performs the designated operation (e.g., unlocks the door).

SUMMARY

In one example, a system includes a plurality of antennas, an access control mechanism, and a computing resource. The computing resource is configured to initiate each of multiple antennas to transmit a wireless signal and receive values indicative of signal strength of the wireless signals from the multiple antennas. The computing resource also is configured to calculate a position of a wireless electrical device based on the received values and calculate an error value of the calculated position of the wireless electrical device. Further, the computing resource is configured to determine that the error value is greater than an error threshold and to disable the access control mechanism.

In another example, a method includes initiating each of multiple antennas to transmit a wireless signal. The method also includes receiving values indicative of signal strength of the wireless signals from the multiple antennas and calculating a position of a wireless electrical device based on the received values, the calculated position within a threshold distance. Further, the method includes calculating an error value of the calculated position of the wireless electrical device (the calculated error value to be less than an error threshold) and enabling an access control mechanism.

BRIEF DESCRIPTION OF THE DRAWINGS

For a detailed description of various examples, reference will now be made to the accompanying drawings in which.

DETAILED DESCRIPTION

Figure 1:
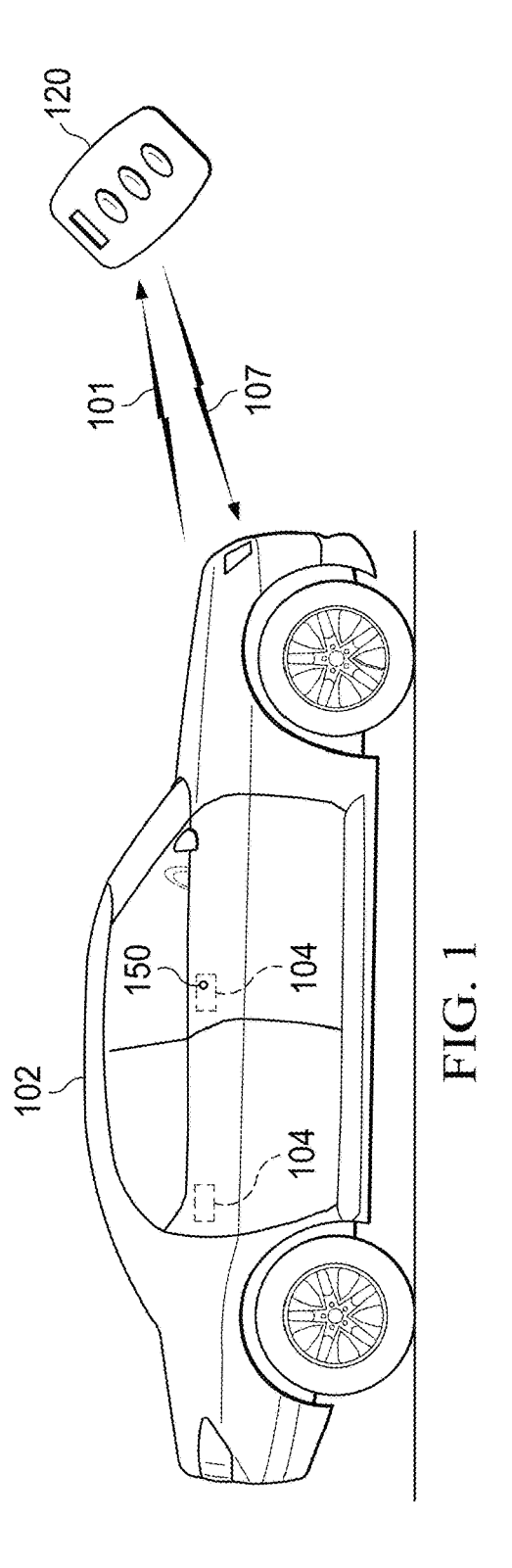
FIG. 1 shows an illustrative diagram for an arrangement of a contactless wireless security system in accordance with various examples.

FIG. 1 shows an illustrative diagram for an arrangement of a contactless wireless security system 100 in accordance with various examples. The example of FIG. 1 illustrates a passive entry/passive start (PEPS) system for a vehicle 102. The vehicle 102 includes multiple antennas 104 installed at various locations around the vehicle. As illustrated in FIG. 1, vehicle 102 may be a vehicle in which wireless antennas 104 are installed around the vehicle (e.g., inside each door near the door handles, in the trunk, etc.).

FIG. 1 also shows a wireless key fob 120 (or other type of wireless electrical device). Wireless key fob 120 may be implemented as portable device to permit an individual to carry the key fob 120 on their person (e.g., pocket, purse, etc.). Key fob 120 may be configured to lock and unlock a door or the trunk of vehicle 102 and/or to start the vehicle. Key fob 120 performs wireless communication with one or more of wireless antennas 104 when key fob 120 is close enough to vehicle 102 such that vehicle 102 is within wireless range of key fob 120. Key fob 120 authenticates itself to vehicle 102. After a determination that key fob 120 is authentic, vehicle 102 may provide the desired functionality (e.g., door locking, unlocking, engine starting, etc.).

Each antenna 104 has the capability of transmitting a challenge message 101 to key fob 120. In some examples, challenge message 101 includes a signal which is received by key fob 120 if key fob 120 is within wireless range of at least one of the antennas 104. Challenge message 101 may cause key fob 120 to transmit a response message 107. The response message 107 may be received by a different antenna than the transmission 104 of vehicle 102, and the receiving channel may be at a different frequency than the transmission channel on which the challenge message 101 was sent. The response message 107 provides credentials to vehicle 102 allowing vehicle 102 to authenticate key fob 120, and thus, allow vehicle 102 to provide the desired functionality (e.g., unlock doors, start the engine, etc.).

Figure 2:
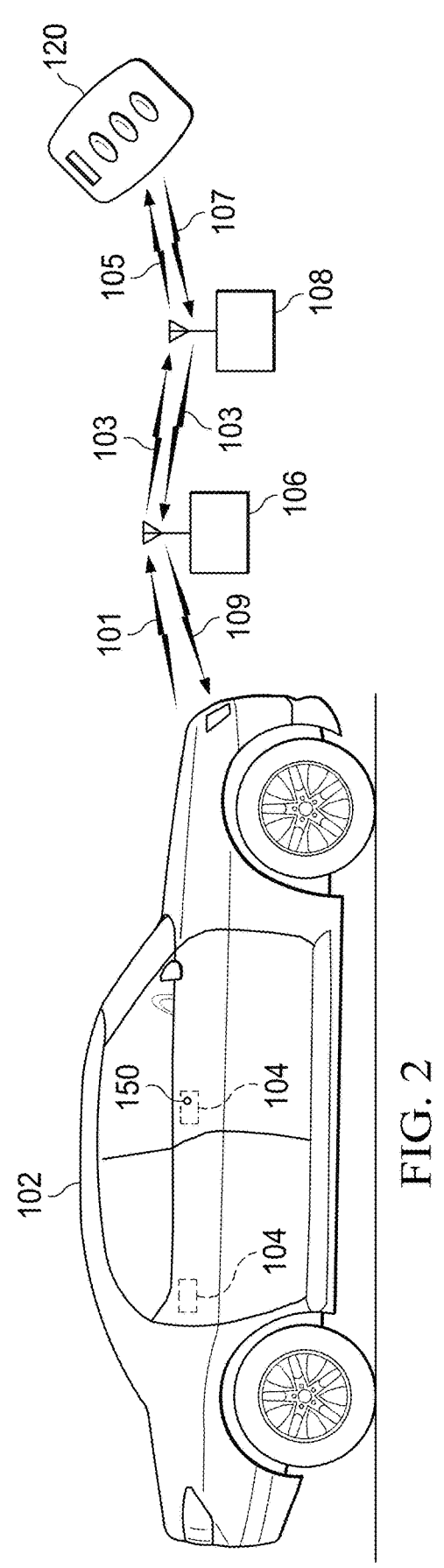
FIG. 2 depicts a possible configuration for caring out a relay attack.

FIG. 2 depicts a possible configuration for carrying out a relay attack. Relay attack kit 106 acts as an emulator for key fob 120 and relay attack kit 108 acts as an emulator for vehicle 102. The attack kits 106 and 108 communicate with each other through transmission link 103. More specifically, attack kit 106 is brought by an individual to a location in sufficiently close proximity to vehicle 102 to receive challenge message 101 from one of wireless antennas 104 (i.e., is close enough such that attack kit 106 may communicate wirelessly with vehicle 102). Attack kit 106 then may receive challenge message 101 from vehicle 102 whenever vehicle 102 transmits challenge message 101. Vehicle 102 may continuously transmit challenge message 101 or vehicle 102 may transmit challenge message 101 in response to an outside action, such as touching vehicle 102 at location 150, detection by vehicle 102 of movement in close proximity to vehicle 102, pushing a button, or by other mechanisms to initiate the challenge-response protocol.

Once challenge message 101 begins transmitting, attack kit 106 relays challenge message 101, via transmission link 103, to attack kit 108. Attack kit 108 is within close proximity of key fob 120 (i.e., is close enough such that attack kit 108 may communicate wirelessly with key fob 120). Upon receiving challenge message 101 from attack kit 106 through transmission link 103, attack kit 108 generates signal 105 to be received by key fob 120. Signal 105 is a copy of challenge message 101 after being relayed by attack kit 106 to attack kit 108. Key fob 120 receives signal 105 from attack kit 108 and, unaware, that the signal originated from attack kit 108 instead of a vehicle 102, starts to authenticate itself to vehicle 102 by transmitting the response message 107 to what it believes is a valid challenge message.

Sharing the same operational principle described above, attack kit 108 emulating vehicle 102, relays response message 107 to attack kit 106 via transmission link 103. Attack kit 106 transmits signal 109 copying the content of the response message 107 from key fob 120. In another attack example, response message has a large enough range that so that attack kits 106 and 108 may not be needed to relay the response message 107 back to the vehicle. Further, in some implementations a response message 107 is not needed at all. Vehicle 102 receives signal 109, which is a copy of response message 107 to the challenge message 101 and uses the received signal to perform an authentication process. Once the authentication (of presumed key fob 120) is successful, the individual utilizing attack kit 106 will be able to achieve the desired result (e.g., door locking, unlocking, engine starting). This relay attack may occur despite key fob 120 being so far from vehicle 102 so as not to be in direct communication with vehicle 102. That is, transmission link 103 between attack kits 106 and 108 may have at least one bi-directional transmission channel of a type that allows there to be a distance between the attack kits 106 and 108 that is greater than the maximum distance over which the wireless antennas 104 of vehicle 102 can directly communicate with key fob 120.

Figure 3:
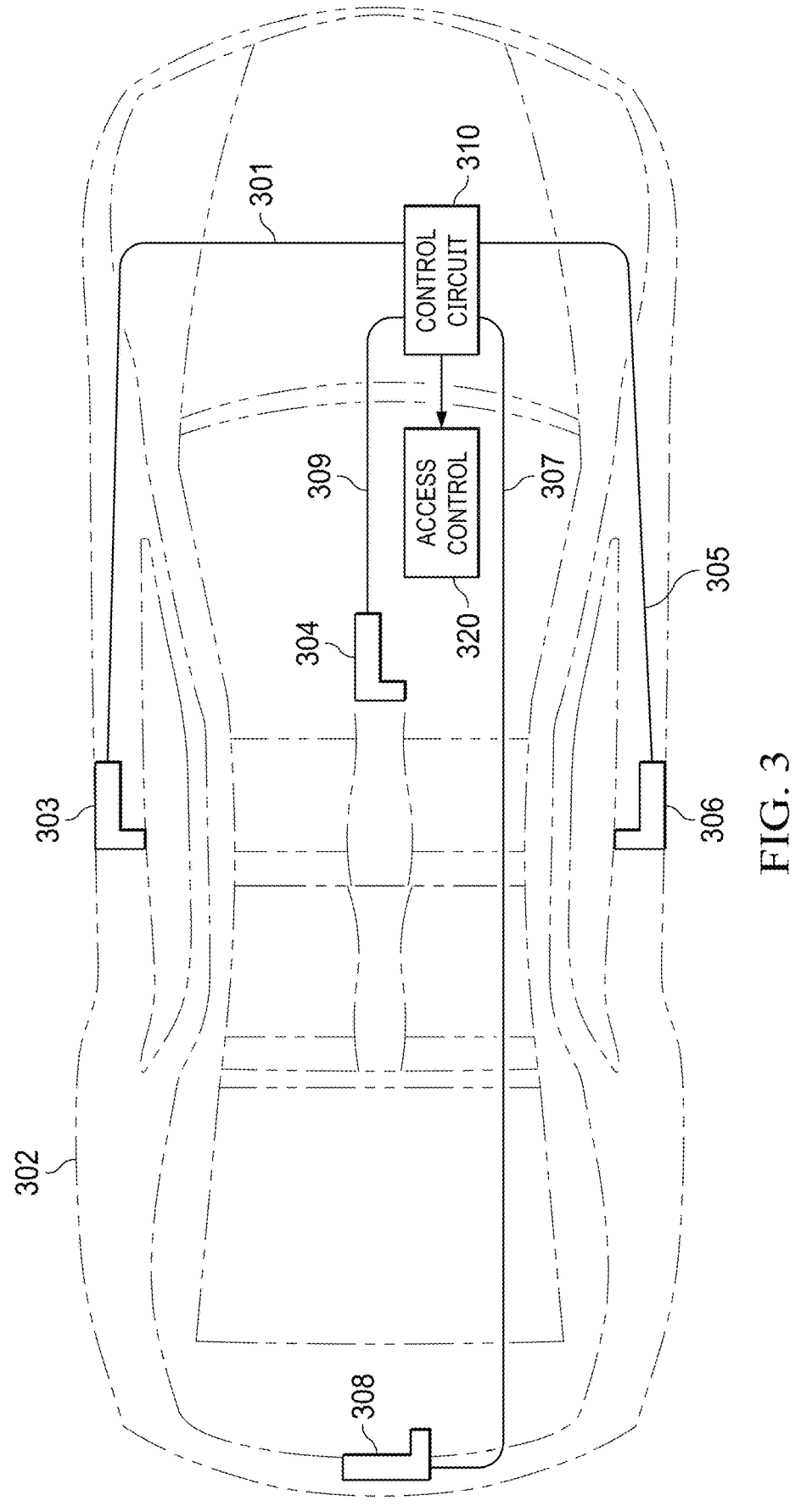
FIG. 3 illustrates a vehicle with a control circuit in accordance with an example.

FIG. 3 illustrates a vehicle 302 with antennas 303, 304, 306, and 308, control circuit 310, and access control mechanism 320. While four antennas 303-308 are shown in this example, any suitable number of antennas are possible. The antennas 303-308 are mounted within vehicle 302 at the locations as shown or at different locations within the vehicle 302. At least two of the antennas are oriented orthogonal to each other. As shown in this example, antenna 308 is mounted orthogonal to antennas 303, 304, and 306. The control circuit 310 is electrically connected to each of the antennas 303-308 through corresponding conductors 301, 309, 305, and 307. The control circuit 310 can cause each antenna 303-308 to separately transmit a wireless signal therefrom. That is, the control circuit 310 can transmit a signal over conductor 301 to antenna 303 to cause antenna to transmit a wireless signal. Similarly, the control circuit 310 can cause each of the other antennas 304-308 to transmit wireless signals. The control circuit 310 may cause only one antenna at a time to transmit a wireless signal or may cause two or more antennas to concurrently transmit wireless signals. If the control circuit 310 operates each antenna separately, then each antenna can transmit a wireless signal at the same frequency. If two or more antennas are used to concurrently transmit wireless signals, then the control circuit 310 causes the antennas to use different frequencies to avoid interference.

The access control mechanism 320 is coupled to the control circuit 310 and controls one or more functions of the vehicle 302 such as unlocking the doors and/or permitting the vehicle's motor to be started. For a vehicle with an internal combustion engine, the access control mechanism 320 permits the engine to be started such as by turning a key in the ignition or pressing a "start" button. For an electric vehicle, the access control mechanism 320 permits the vehicle's electric motor to be activated.

Figure 4:
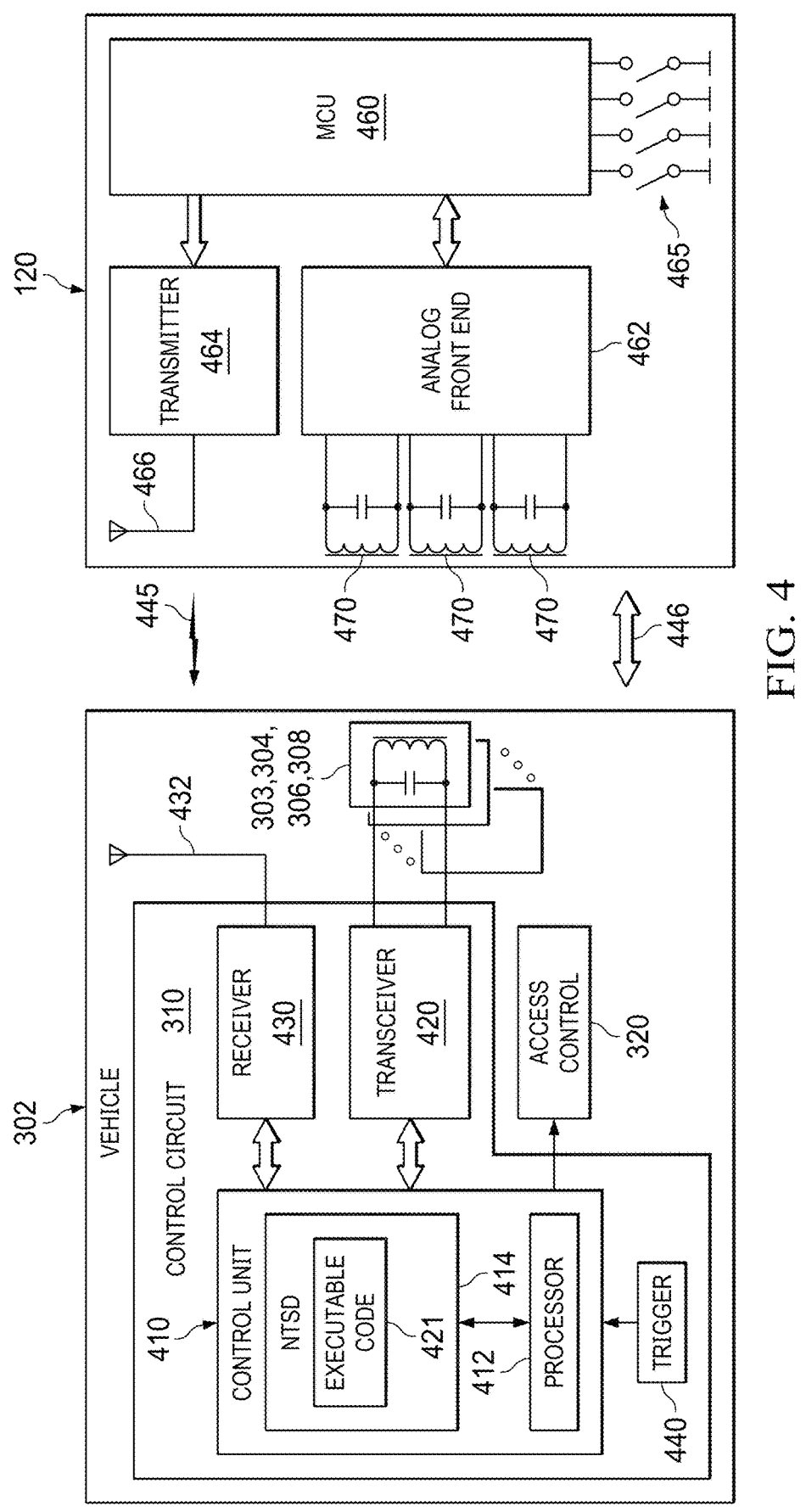
FIG. 4 illustrates additional detail of the control circuit 310 and a key fob in accordance with an example.

FIG. 4 is an example illustrating additional detail for the key fob 120 and the various electronic systems within the vehicle 302. In this example, the control circuit 310 of the vehicle 302 includes a control unit 410, a transceiver 420, a receiver 430, and a trigger 440. The trigger 440 represents any source or signal to start the communication described herein, for example, touching a door handle, a periodic timer, etc. An antenna 432 is coupled to the receiver 430. The antennas 303, 304, 306, and 308 are coupled to the transceiver 420. The access control mechanism 320 is coupled to the control unit 410. The control unit 410 includes one or more processors 412 (also referred to as a computing resource) coupled to a non-transitory storage device 414. Non-transitory storage device 414 may comprise volatile storage (e.g., random access memory), non-volatile storage (e.g., a solid-state storage drive, read-only memory, etc.), etc. The non-transitory storage device 414 stores executable code 421, which is executable by processor(s) 412.

The key fob 120 includes a microcontroller unit (MCU) 460, an analog front end (AFE) 462, a transmitter 464, an antenna 466 coupled to the transmitter 464, and antennas 470 coupled to the AFE 462. A set of buttons 465 are coupled to the MCU 460 and used for remote keyless entry (RKE) such as manual unlocking of the vehicle without a distance measurement. The MCU 460 may include one or more processors, memory, etc. The MCU 460 may cause transmitter 464 to transmit a wireless signal to antenna 432. Bidirectional signals can be transmitted between antennas 303-308 and antennas 370 within the key fob 120. Three antennas 470 are shown in the example of FIG. 4, and the three antennas 470 are positioned within a housing of the key fob such that the antennas 470 are orthogonal to each other.

The wireless channel 445 between transmitter 464 and receiver 430 may be an ultra-high frequency (UHF) channel (e.g., 315 MHz, 433 MHz, etc.). The wireless channel 446 between the AFE 462 and transceiver 420 may comprise a lower frequency channel (e.g., 100-200 KHz). Channel 445 can be used for an authentication process, that is, for the key fob 120 to be authenticated to the control circuit 310. Channel 446 may be used, as described herein, to determine the location of the key fob 120 relative to the vehicle 302 and an error value calculated for the determined location of the key fob 120.

As explained above, the three antennas 470 of the key fob 120 are arranged orthogonal to each other (e.g., x, y, z axes). Each antenna 470 is unidirectional meaning that the antenna is more sensitive to wireless signals from one direction than another/orthogonal direction. Because the key fob 120 has three orthogonally-arranged antennas 470, at least one of the three antennas will be able to detect a signal from a given vehicle antenna 303-308 regardless of the physical orientation of the portable key fob 102 relative to the vehicle. That the key fob 102 has three orthogonally-arranged antennas 470 can be used by the control circuit 310 to accurately determine the location of the key fob.

Figure 5:
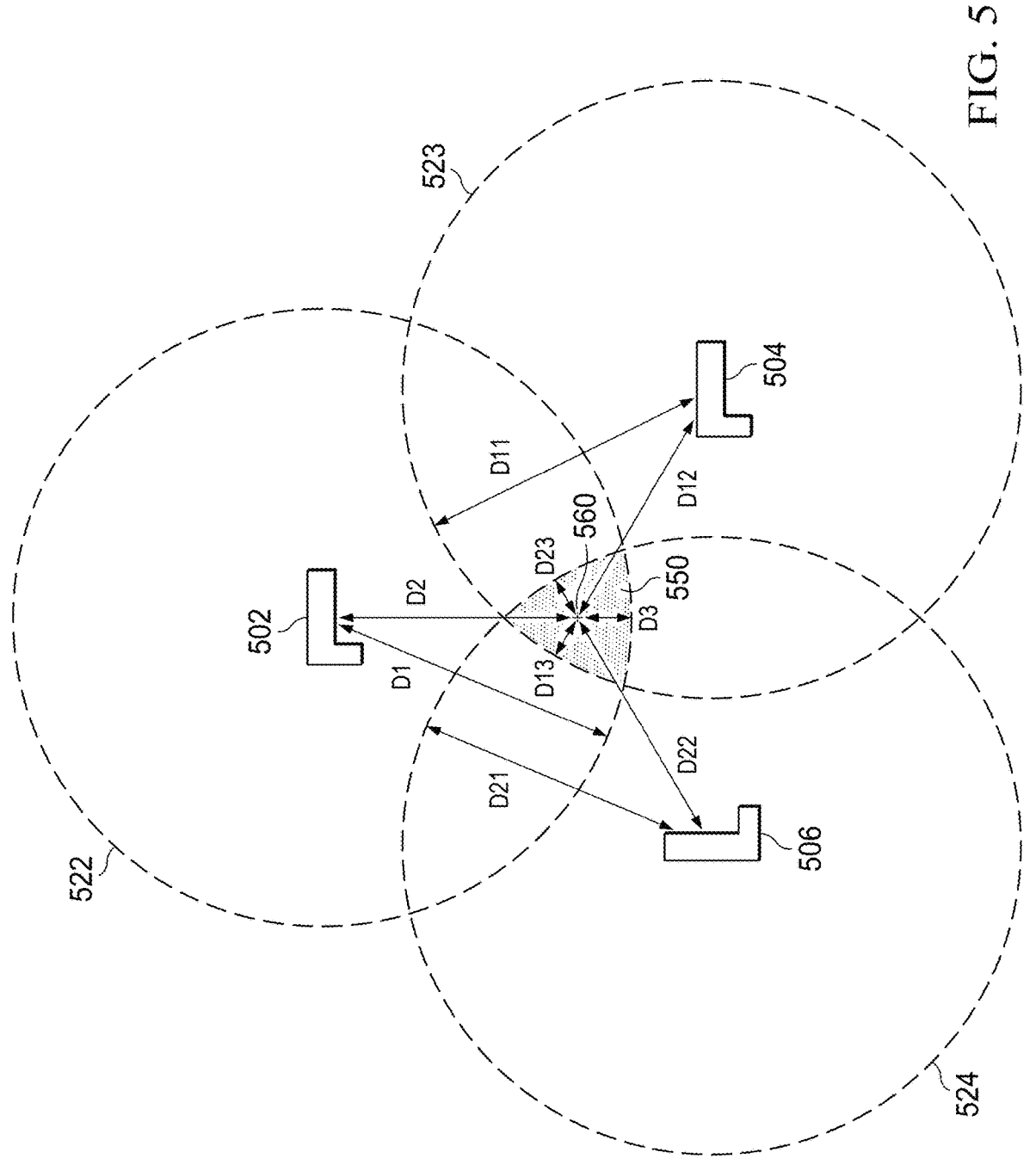
FIG. 5 illustrates an example of a determination of the location of a wireless device relative to a vehicle for which an error value is relatively low.

FIG. 5 shows an example of a determination of a key fob relative to three vehicle antennas 502, 504, and 506, with antenna 506 arranged orthogonal to antennas 502 and 504. The orientation of an antenna refers to the fact that a given antenna is more sensitive to wireless signals received at the antenna from one direction than from another direction. The control circuit 310 causes (e.g., processor(s) 412 executing executable code 421) each of the antennas 502, 504, and 506 to transmit a wireless signal for detection by the key fob's antenna(s) 470. In one example, the control circuit 310 may sequentially cause each antenna 502 to 506 to transmit a signal. In other examples, the control circuit 310 may concurrently cause antennas 502, 504, and 506 to transmit signals (e.g., at different frequencies) for detection by the key fob 102.

If the key fob 102 is within wireless range of the vehicle (e.g., within 30 feet), the key fob 102 detects the signals from the antennas 502-506. The strength of the wireless signal detected by the key fob from a given antenna 502-506 is a function, at least in part, of the distance between the key fob and the respective antenna 502-506. The detected signal strength may the average or root mean square (rms) of the current or voltage from each of the key fob's antennas 470. In other example, the detected signal strength may be the largest current or voltage from the three antennas 470. The detected signal strength is thus a proxy for distance between the key fob 102 and the antenna. In the example of FIG. 5, the strength of the signal from antenna 502 and received by the key fob 102 is at a level that means that the key fob is a distance D1 from antenna 501. Distance D1 defines the radius of circle 522 centered on antenna 502. In these examples, the location of points at the same field strength is shown as a circle for simplicity but may be elliptical instead. The antennas described herein are more sensitive to wireless signals received at the antenna from one direction than another, and thus the shape of the common field strength lines are generally elliptical. Similarly, based on the strength of the signals detected by key fob 102 from the other antennas 504 and 506, key fob 102 is determined to be a distance D11 from antenna 504 and D21 from antenna 506. Distance D11 defines the radius of circle 523 centered on antenna 504. Distance D21 defines the radius of circle 524 centered on antenna 506. The locations of the antennas 502-506 are fixed within the vehicle and thus the circles 522-524 relative to the vehicle can be determined. In one example, a coordinate system for the vehicle is predefined with the origin of the coordinate system being at a predetermined location with the vehicle.

In one implementation, the key fob 102 transmits the signal strength values via transmitter 464 to receiver 430 to thus be received by the processor(s) 412. In another example, the key fob's MCU 460 converts the detected signal strengths to distance values and transmits the distance values to the processor(s) 412. The three circles 522, 523, and 524 have an overlap region 550. The processor(s) 412 calculate the geometric center 560 of the overlap region as being the presumed location of the key fob 102. The calculated center 560 is calculated relative to the origin of the vehicle's predefined coordinate system.

With the three orthogonally-arranged antennas 470 of the key fob 102, the accuracy of the calculation of the key fob's location is relatively high. That is, the size of the overlap region 550 is relatively small. The processor(s) 412 calculates the location of the key fob 102 and also calculates an error value associated with the calculated location. In one example, to calculate the error value, the processor(s) 412 calculates, for each antenna 502-506, the difference between (a) the distance from the antenna to the key fob and (b) the distance between the antenna and the calculated key fob location 560. In FIG. 5, for example, the distance from antenna 502 to the key fob is D1 and the distance between the antenna 502 and the calculated key fob location 560 is D2. The aforementioned difference for antenna 502 is D1−D2=D3. D3 represents the individual error for the key fob location based on the signals received from antenna 502 by the key fob. Similarly, the distance from antenna 504 to the key fob is D11 and the distance between the antenna 504 and the calculated key fob location 560 is D12. The aforementioned error difference for antenna 504 is D11−D12=D13. Further, the distance from antenna 506 to the key fob is D21 and the distance between the antenna 506 and the calculated key fob location 560 is D22. The error difference for antenna 506 is D21−D22=D23.

The error value may be calculated by the processor(s) 412, for example, as the square root of the sum of squares of the error differences, that is, the sum of squares between (a) the calculated distances between the multiple antennas 502-506 and the key fob 102 and (b) the calculated distances of the multiple antennas to the calculated position 560 of the key fob. In the example of FIG. 5, the error value is:

$$\text{ERROR VALUE} = \sqrt{D3^2 + D13^2 + D23^2} \qquad (1)$$

Figure 6:
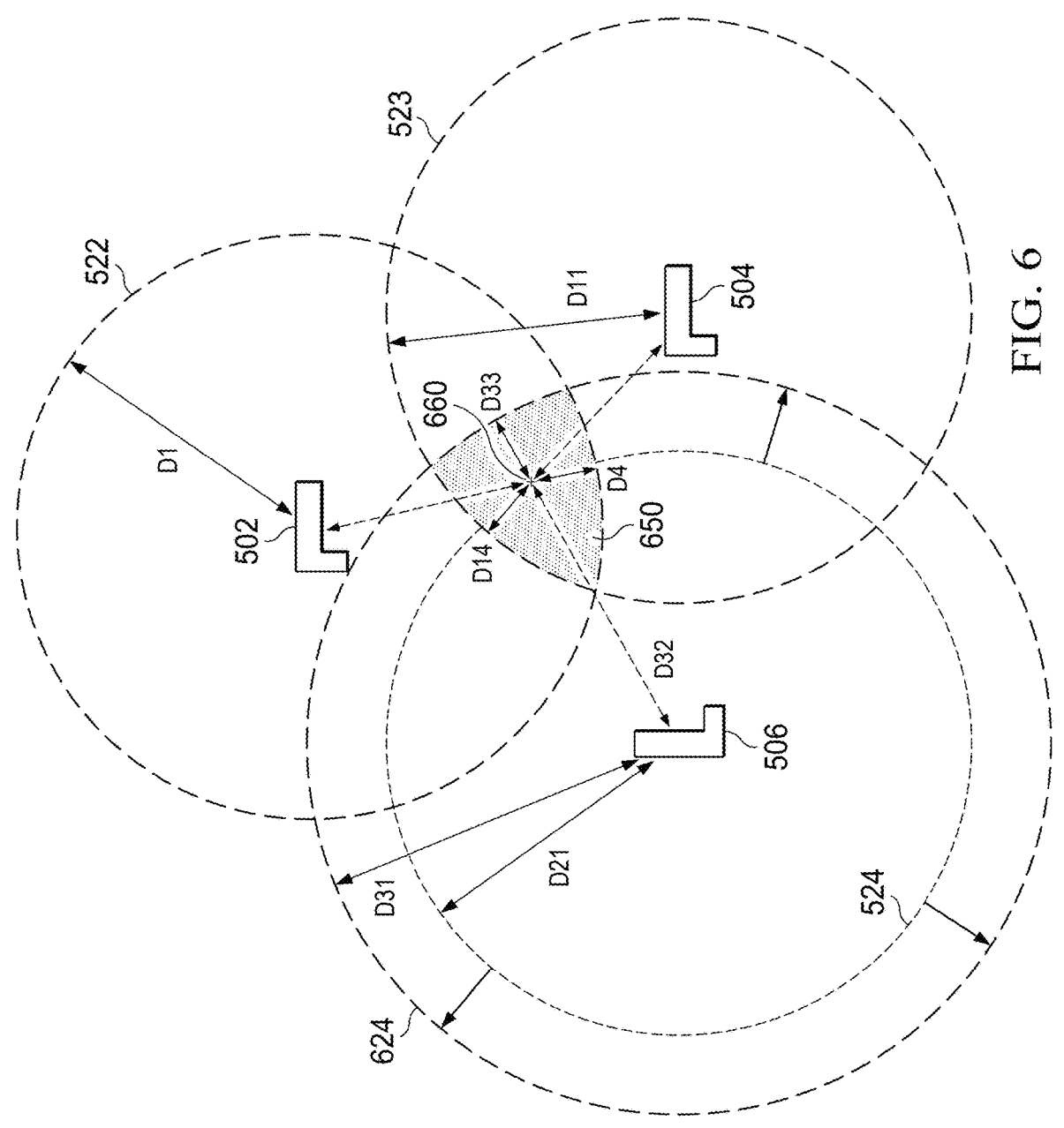
FIG. 6 illustrates an example of a determination of the location of a wireless device relative to a vehicle for which the error value is relatively large.

FIG. 6 illustrates an example similar to FIG. 5, but instead of using a three-antenna key fob 120, a single axis wireless device is used such as might be used in an attempt to open the vehicle door and/or start the vehicle. Because the wireless access device is a single-axis device, the device's antenna will likely be oriented with regard to at least one of the antennas 502, 504, and 506 such that the strength of the wireless signal from the antenna is relatively weak. This situation is illustrated in FIG. 6 as the signal received by the single-axis device from antenna 506 is weaker than was the case for the three-axis key fob of FIG. 5. The signal strength values from the single-axis device are transmitted to the control circuit 310 within the vehicle. The control circuit 310 uses the received signal strength values to determine the distance from each antenna 502-506 to the wireless device. In the example of FIG. 6, the determined distances from antenna 502 and 504 to the wireless device is D1 and D11, respectively, as was the case for FIG. 5.

The determined distance from antenna 506 to the wireless device is D31, which is larger than D21 (FIG. 5). Thus circle 524 centered on antenna 506 has expanded out to circle 624 as shown in FIG. 6. The radius of circle 624 is D31. As such, the overlap region 650 among the three circles 522, 523, and 624 is shown at 650 and is larger than overlap region 550 of FIG. 5. The processor(s) 412 calculate the geometric center of the overlap region 650. Reference numeral 660 identifies the location of the geometric center of the overlap region 650. For antenna 502, the error value is shown as D4 (D1 minus the distance from antenna 502 to location 660). For antenna 504, the error value is shown as D14 (D11 minus the distance from antenna 504 to location 660). Similarly, for antenna 506, the error value is shown as D33 (D31 minus the distance from antenna 506 to location 660). The calculated error value based on the three individual error values is:

$$\text{ERROR VALUE} = \sqrt{D4^2 + D14^2 + D33^2} \qquad (2)$$

Comparing FIG. 6 to FIG. 5, because D4 (for antenna 502) is larger than D3, D14 (for antenna 504) is larger than D13, and D33 (for antenna 506) is larger than D23, the overall computed error for FIG. 6 is larger than the corresponding error value for FIG. 5.

To enable the access control circuit 320 to unlock the doors of the vehicle 302 and/or to enable the vehicle's motor, the processor(s) 412 determine whether at least both of the following conditions are true. First, the wireless device which receives signals from the vehicle's antennas is determined to be less than a distance threshold. Second, the error value computed for the wireless device is determined to be less than an error threshold value. That is, the wireless device is fairly close to the vehicle (e.g., within 30 feet) and the error value is relatively small. The distance and error thresholds may be preset and application specific.

With regard to the example of FIG. 5, the computed distance of location 560 relative to vehicle 302 is determined to be less than the threshold distance, and the computed error value (Eq. (1) above) is determined to be less than the error threshold value. As such, the control circuit 310 will cause the access control circuit 320 to be activated to, for example, unlock the doors and/or enable the motor.

In the example of FIG. 6, however, while the computed distance of location 660 relative to vehicle 302 is determined to be less than the threshold distance, the computed error value (Eq. (2) above) is determined to be greater than the error threshold value. As such, the control circuit 310 will not cause the access control circuit 320 to be activated and thus, the either or both of the doors will remain locked and the vehicle's motor will not be engaged.

Figure 7:
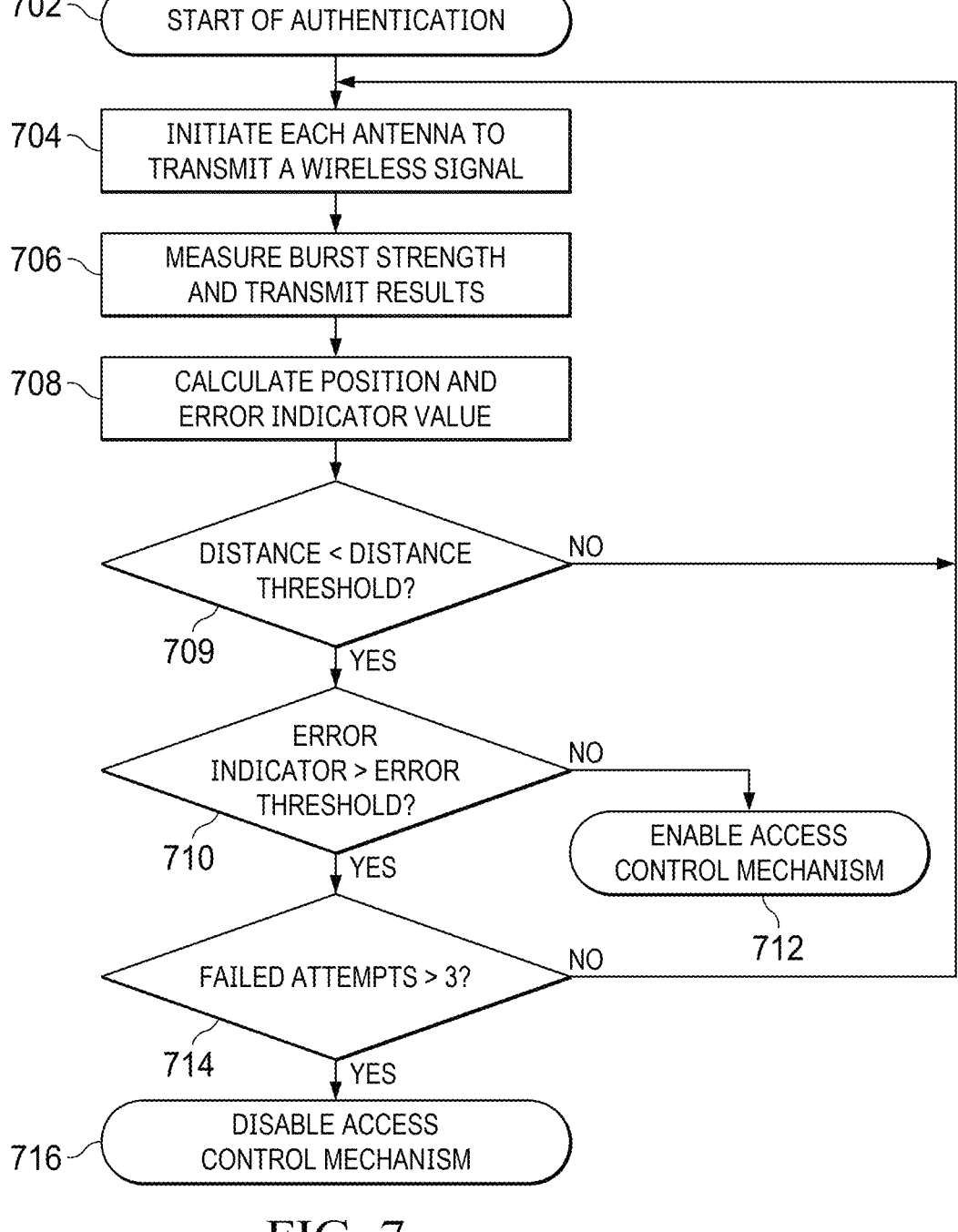
FIG. 7 shows an example of a method performed by the control circuit of FIG. 2.

FIG. 7 illustrates an example method to determine whether the enable the access control mechanism 320 or disable or keep disabled the access control mechanism. At 702, the method includes starting the authentication process. This operation may be performed as a wireless device (e.g., legitimate key fob for the vehicle or a fraudulent device) is brought close enough to the vehicle to detect wireless signals from the vehicle's antennas. At 704, the method includes the control circuit 310 causes each of multiple antennas within the vehicle to transmit a wireless signal (simultaneously or sequentially).

At 706, the wireless device receives the wireless signals and determines the strength of each wireless signal. The wireless device then transmits the signal strength values to the control circuit 310 via transmitter 464 and receiver 430. At 708, the control circuit 310 (e.g., its processor(s) 412) calculates, as explained above, the position of the wireless device (and thus the distance to the vehicle) and the corresponding error value.

If, at 709, the distance is greater than a distance threshold value (a value corresponding to, for example, 30 feet), then control loops back to 704. Otherwise (when the distance is less than the distance threshold), control passes to 910.

If the calculated error value is less than the error threshold value (as determined at 710), then at 712, the control circuit 310 enables the access control mechanism 320. However, if the error value is greater than the error threshold value, then the access control mechanism is not enabled. In the example of FIG. 7, the access control mechanism is affirmatively disabled at 716 following at least n failed attempts as determined at 714. That is, the access control mechanism may not be disabled just on the basis of determining once that the error value is greater than the error threshold value. In the example of FIG. 7, the access control mechanism is disabled at 716 upon the occurrence of three (n equals 3) times that the calculated error value is greater than the error threshold.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A non-transitory storage device including machine executable instructions which, when executed by a computing resource, cause the computing resource to:

cause each of multiple antennas to transmit a respective wireless signal;

receive values indicative of a signal strength of each respective wireless signal transmitted from each of the multiple antennas;

calculate a first respective distance between each of the multiple antennas and a wireless electrical device responsive to the received values, wherein each first respective distance is associated with a radius about a corresponding one of the multiple antennas, and wherein the radii overlap in an overlap region;

calculate a position of the wireless electrical device as a point within the overlap region;

calculate a second respective distance between each antenna and the point within the overlap region;

calculate an error value as a function of the first respective distance and the second respective distance, including calculating the error value as a square root of a sum of squares of differences between the first respective distance and the second respective distance; and disable an access control mechanism coupled to the computing resource in response to the error value being greater than an error threshold.

2. The non-transitory storage device of claim 1, wherein the multiple antennas comprise at least four antennas.

3. The non-transitory storage device of claim 1, wherein disabling the access control mechanism comprises disabling activation of an access control mechanism of a vehicle motor.

4. The non-transitory storage device of claim 1, wherein at least two antennas of the multiple antennas are oriented orthogonal to each other.

5. The non-transitory storage device of claim 1, wherein the machine executable instructions, when executed by the computing resource, cause the computing resource to sequentially transmit, by the multiple antennas, the respective wireless signals.

6. The non-transitory storage device of claim 1, wherein the machine executable instructions, when executed by the computing resource, cause the computing resource to simultaneously transmit, by the multiple antennas, the respective wireless signals.

7. The non-transitory storage device of claim 1, wherein receiving the values indicative of the signal strength of each of the respective wireless signal transmitted from each of the multiple antennas comprises receiving the values from the wireless electrical device.

8. The non-transitory storage device of claim 1, wherein the multiple antennas are coupled to the computing resource.

9. A method comprising:

causing, by a control circuit, each of multiple antennas to transmit a respective wireless signal to a wireless electrical device, the multiple antennas coupled to the control circuit;

receiving, from the wireless electrical device and by the control circuit, a second signal comprising values indicative of signal strength of the respective wireless signals transmitted by the multiple antennas;

calculating, by the control circuit, a first respective distance between each of the multiple antennas and the wireless electrical device responsive the received values, wherein each first respective distance is associated with a radius about a corresponding one of the multiple antennas, and wherein the radii overlap in an overlap region;

calculating, by the control circuit, a position of the wireless electrical device as a point within the overlap region;

calculating a second respective distance between each antenna and the point within the overlap region;

calculating, by the control circuit, an error value as a function of the first respective distance and the second respective distance, wherein calculating the error value comprises calculating a square root of a sum of squares of differences between the first respective distance and the second respective distance; and enabling, by the control circuit, an access control mechanism coupled to the control circuit responsive to the calculated error value being lower than an error threshold.

10. The method of claim 9, further comprising disabling, by the control circuit, the access control mechanism responsive to (a) the position of the wireless electrical device being within a threshold distance and (b) the error value being greater than the error threshold.

11. The method of claim 9, wherein enabling the access control mechanism is further responsive to the calculated position of the wireless electrical device being within a threshold distance.

12. The method of claim 9, wherein at least two antennas of the multiple antennas are oriented orthogonal to each other.

13. The method of claim 9, wherein causing each of the multiple antennas to transmit the respective wireless signal comprises causing each of the multiple antennas to sequentially transmit the respective wireless signal.

14. The method of claim 9, wherein causing each of the multiple antennas to transmit the respective wireless signal comprises causing each of the multiple antennas to transmit the respective wireless signal simultaneously.

15. A system comprising:

a plurality of antennas;

an access control mechanism; and a computing resource coupled to the plurality of antennas and to the access control mechanism, the computing resource configured to:

cause each of multiple antennas to transmit a first wireless signal to a wireless electrical device;

receive a second wireless signal from the wireless electrical device, the second wireless signal comprising values indicative of signal strength of the first wireless signal from each of the plurality of antennas;

calculate a first respective distance between each of the multiple antennas and the wireless electrical device responsive to the received values, wherein each first respective distance is associated with a radius about a corresponding one of the plurality of antennas, and wherein the radii overlap in an overlap region;

calculate a position of the wireless electrical device within the overlap region;

calculate a second respective distance between each antenna and the point within the overlap region;

calculate an error value as a function of the first respective distance and the second respective distance, including calculating the error value as a square root of a sum of squares of differences between the first respective distance and the second respective distance; and disable the access control mechanism in response to the error value being greater than an error threshold.

16. The system of claim 15, wherein the system is a vehicle, the vehicle includes a door, and wherein the access control mechanism is configured to lock and unlock the door.

17. The system of claim 15, wherein the plurality of antennas comprises at least four antennas.

18. The system of claim 15, wherein at least two antennas of the plurality of antennas are oriented orthogonal to each other.

19. The system of claim 15, wherein causing each of the plurality of antennas to transmit the respective wireless signal comprises causing each of the plurality of antennas to sequentially transmit the respective wireless signal.

20. The system of claim 15, wherein causing each of the plurality of antennas to transmit the respective wireless signal comprises causing each of the plurality of antennas to simultaneously transmit the respective wireless signal.

\* \* \* \* \*